(12) United States Patent
Braylovskiy et al.

(10) Patent No.: US 9,484,771 B2
(45) Date of Patent: Nov. 1, 2016

(54) UNINTERRUPTABLE POWER SUPPLY FOR DEVICE HAVING POWER SUPPLY MODULES WITH INTERNAL AUTOMATIC TRANSFER SWITCHES

(71) Applicant: Juniper Networks, Inc., Sunnyvale, CA (US)

(72) Inventors: Michael Braylovskiy, San Mateo, CA (US); Jaspal Gill, Tracy, CA (US); Muhammad Sagarwala, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 499 days.

(21) Appl. No.: 14/152,392

(22) Filed: Jan. 10, 2014

(65) Prior Publication Data

US 2015/0123473 A1    May 7, 2015

Related U.S. Application Data

(60) Provisional application No. 61/898,974, filed on Nov. 1, 2013.

(51) Int. Cl.
*H02J 9/06* (2006.01)
*H02J 1/10* (2006.01)
*H02J 3/00* (2006.01)

(52) U.S. Cl.
CPC ............. *H02J 9/061* (2013.01); *H02J 1/102* (2013.01); *Y10T 307/344* (2015.04); *Y10T 307/615* (2015.04)

(58) Field of Classification Search
CPC ..................................................... H02J 3/00
USPC ........................................................ 307/64
See application file for complete search history.

(56) References Cited

U.S. PATENT DOCUMENTS

| 5,920,129 A | 7/1999 | Smith |
| 5,939,799 A | 8/1999 | Weinstein |
| 7,119,457 B1 * | 10/2006 | Flegel ................ H02J 3/14 307/64 |
| 2014/0375133 A1 | 12/2014 | McCarthy et al. |

OTHER PUBLICATIONS

"Information technology equipment—Safety—Part 1: General requirements," International Standard IEC 60950-1, Second Edition, Dec. 2005, 312 pp.
U.S. Appl. No. 13/946,916, by David K. Owen, filed Jul. 19, 2013. 35 pp.

* cited by examiner

*Primary Examiner* — Robert Deberadinis
(74) *Attorney, Agent, or Firm* — Shumaker & Sieffert, P.A.

(57) ABSTRACT

Techniques are described for determining whether power from a first power source is unavailable to a power supply module. In response to determining that power from the first power source is unavailable, the techniques de-couple the first power source from one or more components of an electronic device connected to an output of the power supply module with one or more de-coupling components of the power supply module that connect an automatic transfer switch (ATS) of the power supply module to an output of the power supply module. Subsequent to de-coupling the first power source from the one or more components of the electronic device, the techniques de-couple a power supply module from the first power source. The techniques couple the power supply module to a second power source for delivering power to the one or more components of the electronic device.

20 Claims, 9 Drawing Sheets

UNINTERRUPTABLE POWER SUPPLY FOR DEVICE HAVING POWER SUPPLY MODULES WITH INTERNAL AUTOMATIC TRANSFER SWITCHES

This application claims the benefit of U.S. Provisional Application No. 61/898,974, filed Nov. 1, 2013, the content of which is incorporated by reference in its entirety.

TECHNICAL FIELD

This disclosure relates to power feeds of a power supply, and more particularly, to relays coupled to the power feeds and the power supply.

BACKGROUND

Exponential growth of computer networks around the world, as well as ever-increasing reliance on those networks, imposes challenging requirements on reliability of telecommunication equipment (switches, routers etc.). As such, maintaining uninterruptable operation of telecommunication equipment is an important operational requirement for manufacturers of such equipment. One technique of achieving uninterruptable operation is redundant configuration of main components of telecommunication equipment, including utilizing redundant power supply modules (PSMs) and AC power sources.

Quality of energy provide by an AC power source is often not perfect. For example, interruption of AC energy flow frequently occurs due a variety of factors, such as weather condition, overload of AC lines at peak times, etc. In the event an AC line interruption lasts longer then a hold-up time of an AC/DC power supply module (PSM) that supplies power to the telecommunication equipment, the equipment ceases operation. Many complex telecommunication devices require significant time to restart once power is restored. As a result, even a short power disruption may result in severe interruption of network traffic.

To provide redundant power feeds to an electronic device, AC distribution may include automatic transfer switches (ATSs). An ATS couples to a plurality of power feeds to one or more power supplies of the electronic device. The power supplies receive power from one of the power feeds at a time via the ATS, convert the received AC power to DC power to power up the electronic device. If power from a primary power feed becomes unavailable, the ATS quickly switches from the primary power feed to a backup power feed so that input power to the one or more power supplies is uninterrupted. This switching allows the electronic device to remain operational even when the primary power feed is unavailable.

SUMMARY

This disclosure describes one or more de-coupling components of a power supply module of an electronic device that connect an automatic transfer switch (ATS) of the power supply module to an output of the power supply module. The de-coupling components de-couple one or more components of the electronic device connected to the output of the power supply module from a primary power source, in response to power from the primary power source being unavailable, prior to the ATS de-coupling the power supply module from the primary power source and prior to the ATS coupling the power supply module to a secondary power source for delivering power to the one or more components of the electronic device.

In this manner, the techniques described in this disclosure may ensure that input current into the power supply module is approximately zero amperes (amps or A) before transitioning the power supply module from receiving power from the secondary power source. For example, the techniques may assert or de-assert control signals to de-coupling components such as rectifiers to control the input current and ensure that the ATS transitions from the primary power source to the secondary power source after the input current is approximately zero amps (i.e., interrupt the input current once it crosses zero). Although the ATS may transition from one power source to another source after the input current is approximately zero amps, the ATS may still transition from one power source to another within a required holdup time (e.g., without system interruption).

The techniques described herein may provide certain advantages. For example, with the power supply module including the ATS, the techniques mitigate against the chance of a single point failure. Also, by transitioning from one power source to another after the input current is approximately zero amps, the techniques may reduce arcing, overvoltage spikes, and increase life time and reliability of mechanical relays within the ATS.

In one example, the disclosure describes a method comprising determining, with a controller of a power supply module of an electronic device, whether power from a first power source is unavailable to the power supply module. The method includes responsive to determining that power from the first power source is unavailable, de-coupling, with one or more de-coupling components of the power supply module that connect an automatic transfer switch (ATS) of the power supply module to an output of the power supply module, the first power source from one or more components of the electronic device that are connected to the output of the power supply module. The method also includes subsequent to de-coupling the first power source from the one or more components of the electronic device, de-coupling, with the ATS, the power supply module from the first power source. The method further includes coupling, with the ATS, the power supply module to a second power source for delivering power to the one or more components of the electronic device.

In one example, the disclosure describes an electronic device comprising one or more components and a power supply module. The power supply module includes an output connected to the one or more components, an automatic transfer switch (ATS), one or more de-coupling components that connect the ATS to the output of the power supply module, and a controller. The controller is configured to determine whether power from a first power source is unavailable to the power supply module, cause the one or more de-coupling components to de-couple the first power source from the one or more components of the electronic device that are connected to the output of the power supply module responsive to determining that power from the first power source is unavailable, cause the ATS to de-couple the power supply module from the first power source subsequent to causing the one or more de-coupling components to de-couple the first power source from the one or more components of the electronic device, and cause the ATS to couple the power supply module to a second power source for delivering power to the one or more components of the electronic device.

In one example, the disclosure describes a power supply module for delivering power to an electronic device. The power supply module includes an output connected to one or more components of the electronic device, an automatic transfer switch (ATS), one or more de-coupling components that connect the ATS to the output of the power supply module, and a controller. The controller is configured to determine whether power from a first power source is unavailable to the power supply module, cause the one or more de-coupling components to de-couple the first power source from the one or more components of the electronic device that are connected to the output of the power supply module responsive to determining that power from the first power source is unavailable, cause the ATS to de-couple the power supply module from the first power source subsequent to causing the one or more de-coupling components to de-couple the first power source from the one or more components of the electronic device, and cause the ATS to couple the power supply module to a second power source for delivering power to the one or more components of the electronic device.

In one example, the disclosure describes a system comprising means for determining, with a controller of a power supply module of an electronic device, whether power from a first power source is unavailable to the power supply module. The system also includes means for de-coupling the first power source from one or more components of the electronic device that are connected to the output of the power supply module responsive to determining that power from the first power source is unavailable, wherein the means for de-coupling connects an automatic transfer switch (ATS) of the power supply module to an output of the power supply module. The system further includes means for de-coupling, with the ATS, the power supply module from the first power source subsequent to de-coupling the first power source from the one or more components of the electronic device. The system also includes means for coupling, with the ATS, the power supply module to a second power source for delivering power to the one or more components of the electronic device.

The details of one or more techniques of the disclosure are set forth in the accompanying drawings and the description below. Other features, objects, and advantages of the techniques will be apparent from the description and drawings, and from the claims.

DETAILED DESCRIPTION

Figure 1:
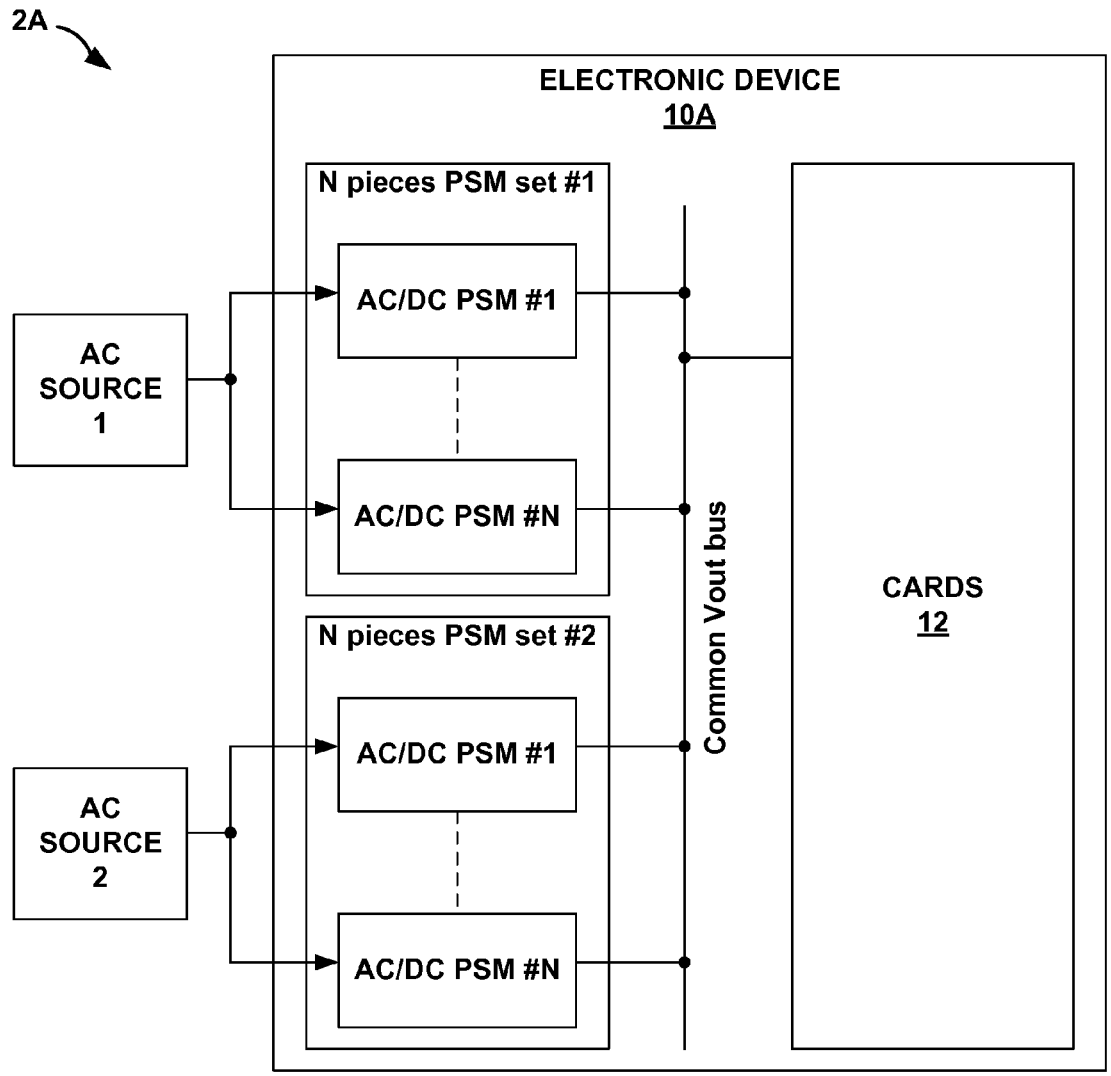
FIG. 1 is a block diagram illustrating an example telecommunication system.

FIG. 1 is a block diagram illustrating a telecommunication system 2A that includes alternating current (AC) power sources (1, 2) coupled to electronic device 10A. Examples of electronic device 10A include a router, switch, gateway, intrusion protection device, firewall and the like. For example, electronic device 10A may route, forward or otherwise transport data in a network, such as a service provider network or a local area network (LAN). The techniques described in this disclosure are not limited to examples where the electronic device is a router, and can be extended to other types of electronic devices that utilize power feeds for supplying power.

In telecommunication system 2A, electronic device 10A includes N+N power supply module (PSM) redundancy scheme with 1+1 redundant AC power sources. For example, as illustrated, electronic device 10A includes a first set of N power supply modules coupled to a first AC power source (i.e., AC Source 1), and a second set of N power supply modules coupled to a second AC power source (i.e., AC Source 2).

The power supply modules illustrated in FIG. 1 receive AC power from respective AC sources 1 or 2 and convert the AC power to a DC power. AC sources 1 and 2 provide alternating-current (AC) power. As one example, AC sources 1 and 2 provide approximately 200 volts AC (VAC) to 277 VAC. In some examples, AC source 1 may be a primary power feed, and AC source 2 may be a redundant, secondary power feed.

The power supply modules output the DC power to a common bus, for instance, the Common Vout Bus illustrated in FIG. 1. The components of electronic device 10A couple to the common bus and receive DC power from the common bus for operation. For instance, FIG. 1 illustrates one or more cards 12 coupled to the common bus. The one or more cards 12 receive power from the N+N power supply modules. Examples of one or more cards 12 include control cards, fabric cards, and line cards, although other components of electronic device 10A may also receive power via the common bus.

In this way, if there is loss of power from one of the AC sources, one or more cards 12 of electronic device 10A may still receive power. For instance, if AC Source 1 was experiencing an interruption (e.g., loss of power or brownout), one or more cards 12 may receive power from the second set of power supply modules coupled to AC Source 2. Similarly, if AC Source 2 was experiencing an interruption (e.g., loss of power or brownout), one or more cards 12 may receive power from the second set of power supply modules coupled to AC Source 1.

However, there may be drawbacks to the system illustrated in FIG. 1. For instance, for redundancy, a total of 2N power supply modules are needed, where N power supplies deliver power and N power supplies provide backup power (e.g., N power supplies were coupled to the first power feed and the other N power supplies were coupled to the second power feed). Utilizing an N+N power supplies redundancy scheme results in the power supplies requiring approximately twice as much space in electronic device 10A and twice the power supply cost as compared to utilizing N power supplies or N+1 power supplies, as may be possible using the techniques described in this disclosure.

Moreover, the N+N PSM redundancy scheme provides poor PSM utilization. For example, each set of N power supply modules may be configured to deliver all the power needed to power the components of electronic device 10A. As one example, if electronic device 10A requires 1000 Watts (W) of power, and assume that N equals 10, then each of the N power supply modules in the first set of N power supply modules is designed to deliver approximately 100 W of power. Because the N power supply modules of the second set of N power supply modules supply power to the components of electronic device 10A in case the first AC power source becomes unavailable, the N power supply modules of the second set of N power supply modules are also designed to each deliver approximately 100 W of power for a total of 1000 W of power.

However, if both the first AC power source and the second AC power source are available, then each power supply module of the N+N power supply modules deliver 50 W (i.e., 50 W*20 power supply modules equals 1000 W). In this case, because the maximum power the can be delivered by a single power supply module is 100 W, but each power supply is only delivering 50 W, the utilization factor of each power supply is only 50 W/100 W or 50% utilization.

Figure 2:
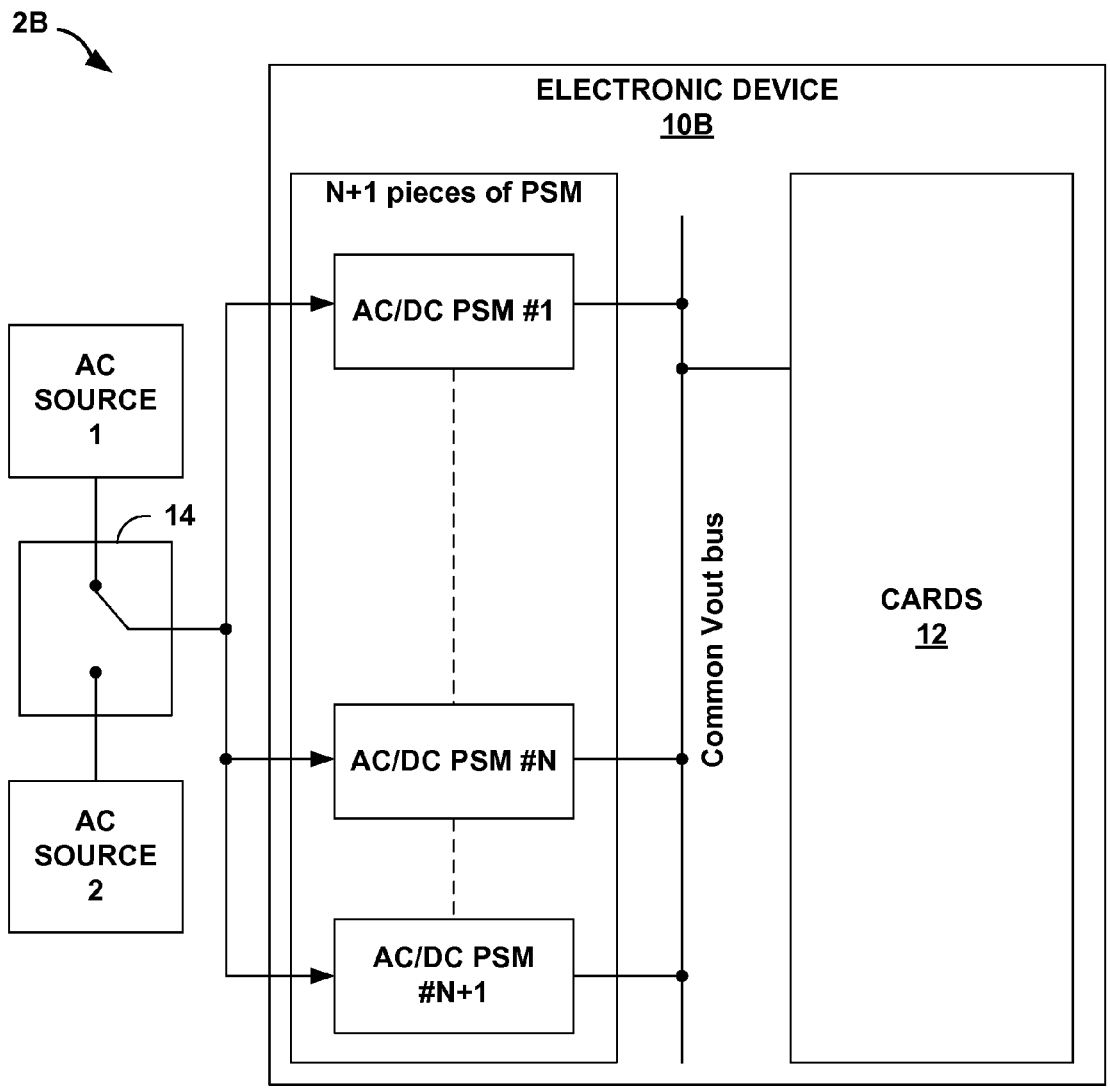
FIG. 2 is a block diagram illustrating another example telecommunication system.

FIG. 2 is a block diagram illustrating another telecommunication system 2B, which includes electronic device 10B coupled to AC power sources (1, 2). Electronic device 10B is similar to electronic device 10A; however, rather than including N+N power supply modules, electronic device 10B includes N+1 power supply modules. Also, telecommunication system 2B is similar to telecommunication system 2A, but includes automatic transfer switch (ATS) 14. The other components of electronic device 10B that are similar to electronic device 10A are not described further.

As illustrated, ATS 14 couples to AC Source 1 and AC Source 2 and selectively outputs the power from one of AC Source 1 and AC Source 2 (i.e., either AC source) to the N+1 power supply modules of electronic device 10B. ATS 14 may reside at the system level (e.g., building power infrastructure level, and not at the equipment level (i.e., within electronic device 10B), and switch between power feeds for all of power supply modules.

In the example illustrated in FIG. 2, if AC Source 1 becomes unavailable, ATS 14 switches power for device 10B from AC Source 1 to AC source 2, and the N+1 power supply modules deliver DC power to cards 12 by receiving power from AC source 2. When power becomes available again via AC Source 1, ATS 14 switches back from AC Source 2 to AC Source 1, and the N+1 power supply modules deliver DC power to cards 12 by receiving power from AC Source 1. For instance, as can be seen ATS 14 is installed in AC distribution line can supply AC power to the input of AC/DC PSMs either from AC Source 1 or from AC Source 2. ATS 14 determines which of the AC power sources provides the power at any time. ATS 14 control detects loss of power or brownout condition for AC power source delivering power at the time and transfers PSM input to second redundant AC power source.

In the example illustrated in FIG. 2, there are N+1 power supply modules where one power supply module (e.g., N+1$^{th}$) functions as a backup power supply module in case one of the other power supply modules malfunctions. For example, during normal operation, each of the N+1 power supply modules delivers DC power. In this case, each power supply module delivers approximately (1/(N+1)) of the total needed power, and if one of the power supply modules malfunctions, then each power supply module delivers approximately 1/N of the total needed power.

There may be better power utilization in the example illustrated in FIG. 2 as compared to the example illustrated in FIG. 1. For example, in FIG. 1, each power supply module is configured to deliver 1/N of the total needed power, and there are 2N power supply modules resulting in approximately 50% utilization. In FIG. 2, each power supply module is also configured to deliver 1/N of the total needed power, but there are N+1 power supply modules resulting in approximately N/(N+1) utilization, which for all cases expect where N equals 1 will result in better than 50% utilization. Also, because there are N+1 power supply modules rather than 2N power supply modules, there is a reduction in space needed to include the power supply modules in an electronic device as well as reduction in cost associated with power supply modules. In other words, advantage of the scheme illustrated in FIG. 2 is reduced number of PSM (N+1 vs. 2N) that results in better system cost effectiveness, saving space occupied by PSMs, increased reliability, and better PSM utilization factor (up to N/(N+1)% of maximum PSM power vs. 50%).

However, there may be some drawbacks with the example illustrated in FIG. 2. For example, standalone ATS 14 in the AC distribution line introduces a single point of failure component. If for some reason ATS 14 fails, the AC power to the entire telecommunication system fails as well and the entire system operation is ceased.

For example, the relay in ATS 14 may become latched and remain coupled to AC Source 1. In this case, if AC Source 1 becomes unavailable (e.g., loss of power, loss of AC cycle, or brownout), the relay in ATS 14 may not switch to AC Source 2, and electronic device 10B may not receive power. As another example, circuitry within ATS 14 that determines whether there is loss of power may malfunction, and ATS 14 may not switch to the other power source in response to a loss of power. In some cases, if ATS 14 completely malfunctions, then even if both AC Source 1 and AC Source 2 are capable of delivering power, ATS 14 may not couple the power to electronic device 10B. In this sense, ATS 14 may create a single point of failure without any redundancy for power delivery in the event that ATS 14 fails or malfunctions.

Figure 3:
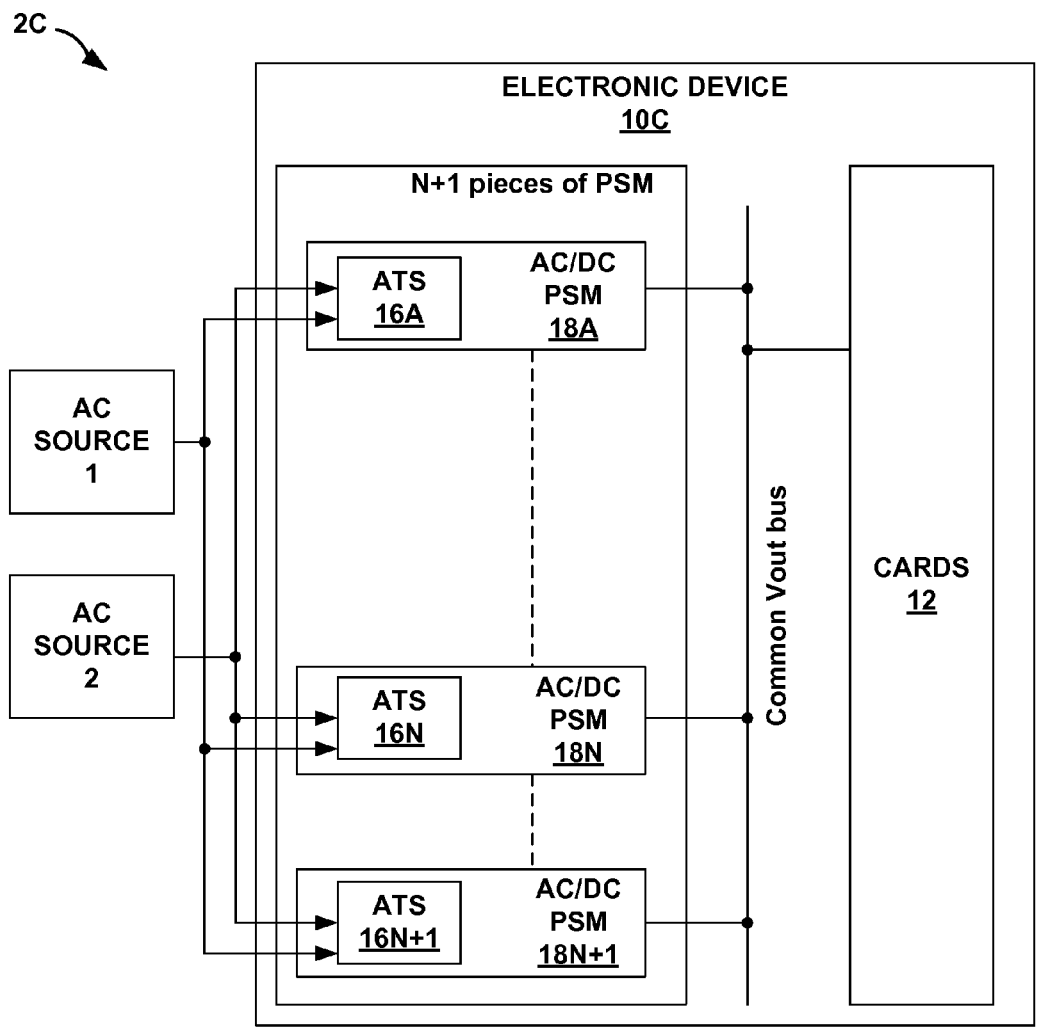
FIG. 3 is a block diagram illustrating an example electronic device configured to implement one or more of the techniques described in this disclosure.

FIG. 3 is a block diagram illustrating an example telecommunication system 2C in which an example electronic device 10C is configured to implement one or more of the techniques described in this disclosure. For instance, in order to avoid single point of failure component, the AC/DC PSM redundancy scheme N+1 with distributed Automatic Transfer Switch (ATS) within each PSM is described in this disclosure.

As illustrated in the example of FIG. 3, telecommunication system 2C includes electronic device 10C, which may be similar to electronic device 10A and 10B. Electronic device 10C includes power supply modules (PSMs) 18A-18N+1 (collectively referred to as PSMs 18). Each one of PSMs 18 includes a respective ATS 16A-16N+1 (collectively referred to as ATSs 16). An example of PSM 18 and ATS 16 is illustrated in greater detail in FIG. 4.

As illustrated in FIG. 3, the techniques described in this disclosure may adopt some or all advantages of the scheme illustrated in FIG. 2 and eliminate a single point of failure component (e.g., ATS 14 of FIG. 2 installed in distribution line). In FIG. 3, each one of PSMs 18 includes its own one of ATSs 16 that allows keeping N+1 PSM redundancy and 1+1 AC source redundancy. In FIG. 3, if for some reason one of ATSs 16 within one of PSMs 18 fatally fails, the system will still continue operating with N pieces of PSMs 18 while the maintenance personnel can replace the failed PSM.

Other example techniques have been described for switching from one power source or another power source, such as those in U.S. Pat. No. 5,939,799. However, these other techniques suffer from some potential drawbacks.

In these other techniques, a determination of whether AC power has been lost is made by monitoring the DC output of the power supply. For instance, transfer power between two AC sources is actuated by sensing of output voltage of AC/DC PSM. Such kind of ATS control will not allow catching missing sine-wave cycles and AC source brownout condition.

Furthermore, in these other techniques, a determination that AC power has been lost may be made incorrectly. For example, a component within the power supply module may malfunction causing the voltage at the DC output to drop. In this case, the drop in the DC voltage is from a malfunction of a component, and not from AC power being lost. Nevertheless, these other techniques may still determine that AC power is lost because DC voltage level dropped, and unnecessarily cause the power supply module to switch from one AC source to the other.

Also, the amount of time it takes the ATS to switch from one power source to another may be too long (e.g., 100-200 milliseconds (ms)). This requires backup battery/Uninterruptible Power Supply (UPS) or another DC backup source connected to the load (e.g., cards 12) in order to maintain uninterruptable system operation. Additional DC backup is expensive. Having such backup also decreases reliability of entire system.

For example, the power supply modules, including PSMs 18, may include a capacitor that charges during normal operation. When the primary power feed (e.g., AC Source 1) becomes unavailable, and the ATS is switching from the primary power feed to the secondary power feed (e.g., AC Source 2), the capacitor may deliver the DC power to the components of the electronic device so that the power to the electronic device is uninterrupted. However, because the components of the electronic device may require a relatively large amount of power, the capacitor may only be able to deliver power for a relatively short amount of time (e.g., in order of 40 ms). If the time it takes the ATS to transfer from one source to another is in the order of 100 ms to 200 ms, the size of the capacitor may be impractically large and costly to serve the components for 100 ms to 200 ms.

In these other techniques, the ATS may have a single mechanical relay. The relay of the ATS may actuate any time it is determined that the DC output voltage is low, including times when there is high current flowing through the contacts. By switching when there is high current flowing though the contacts, there may be overvoltage spikes, which in turn decreases reliability of the entire power system.

Furthermore, the ATS of these other techniques may include only one relay in the current path. This introduces a potential hazard in the event that the relay fails by shorting, which causes voltage from one AC source to feed to the other AC source (e.g., voltage from one AC source could be seen on input feed of second AC source).

As described in more detail, the techniques described in this disclosure may overcome one or more of the drawbacks described above. In one example, this disclosure describes techniques for a dual input uninterruptable AC/DC power supply for telecommunication equipment with smart distributed automatic transfer switch (ATS). As another example, the disclosure describes techniques that enable enforcement of switching of one AC input to another when the former is interrupted or faces a brownout condition. As another example, the disclosure describes techniques that enable transferring power from one AC source to another at the moment when input current crosses zero. By ensuring that the input current is at zero, the techniques may reduce arcing, overvoltage spikes, and increase life time and reliability of ATS mechanical relays. The disclosure also relates to supplying power to the PSM load (e.g., components of electronic device 10C) within system during transfer process from one power source to another, maintaining transfer time within holdup time of the PSM, avoiding overcurrent condition, and making uninterruptable operation of entire telecommunication system. In telecommunication cases, this may result in uninterruptable forwarding or processing of network traffic, as one example. The disclosure also describes techniques that enable a device to meet safety requirement in terms of having reinforced isolation between two input feeds to avoid electrical hazard once AC feed is disconnected.

Figure 4:
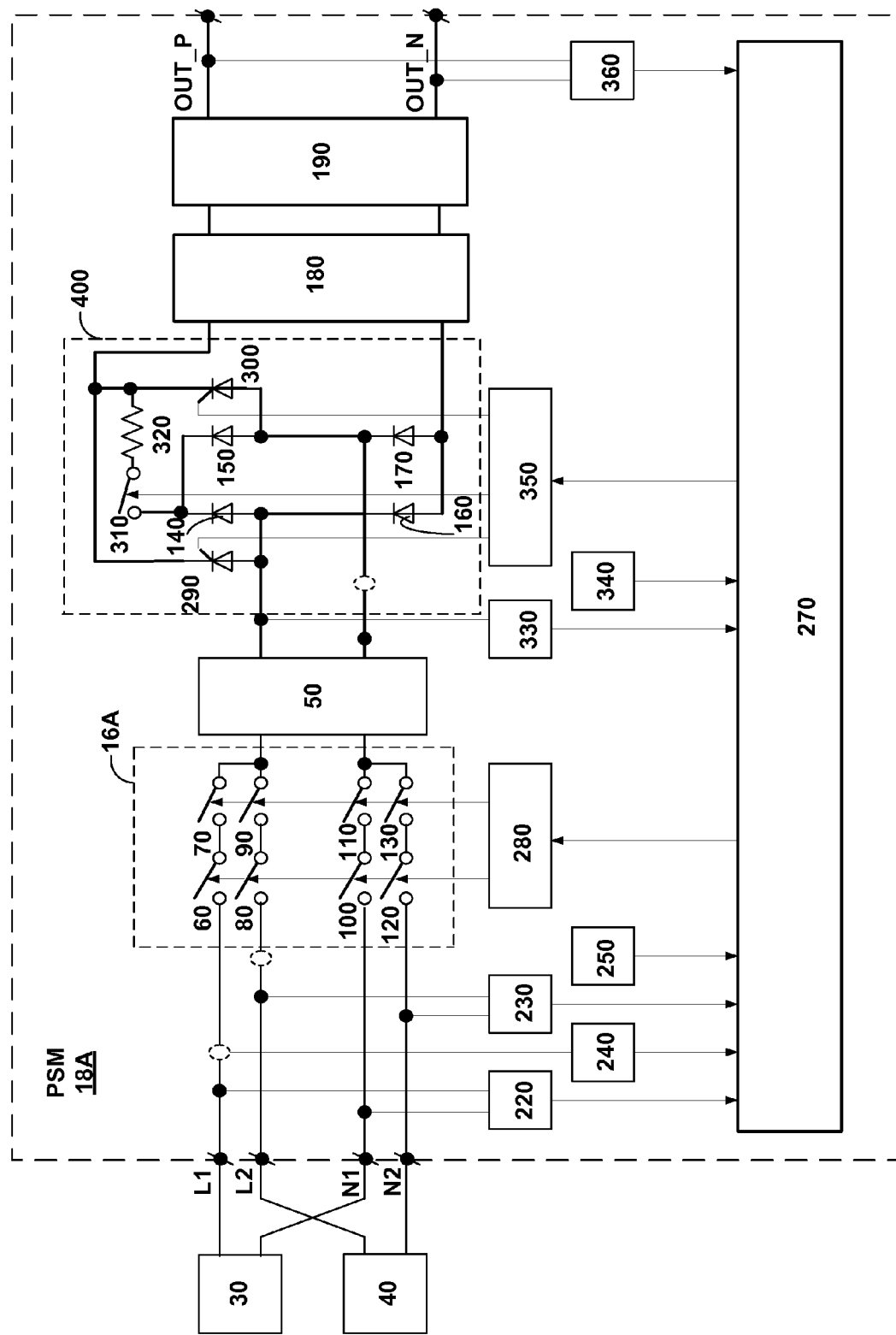
FIG. 4 is a block diagram illustrating one example of a power supply module that includes an automatic transfer switch (ATS) in accordance with one or more examples described in this disclosure.

FIG. 4 is a block diagram illustrating one example of a power supply module that includes an automatic transfer switch (ATS) in accordance with one or more examples described in this disclosure. For example, FIG. 4 illustrates PSM 18A and ATS 16A in greater detail. PSMs 18B-18N+1 and ATSs 16B-16N+1 may be substantially similar to PSM 18A and ATS 16A illustrated in FIG. 4.

As shown in the illustrated example, PSM 18A is coupled to AC power source 30 and AC power source 40. AC power source 30 may be the primary power feed, and AC power source 40 may be secondary, redundant power feed. AC power source 30 and AC power source 40 are substantially similar to AC Source 1 and AC Source 2, respectively, of FIGS. 1-3.

As illustrated, AC power source 30 is coupled to the L1 and N1 input terminals of PSM 18A, and AC power source 40 is coupled to L2 and N2 input terminals of PSM 18A. In the example of FIG. 4, L1 and N1 form a first power feed, where L1 is the "hot" line and carries the voltage, and N1 is the return, neutral line. L2 and N2 form a second power feed, where L2 is the "hot" line, and N2 is the return, neutral line. For purposes of brevity, L1 and N1 together are referred to as a first power feed and L2 and N2 together are referred to as a second power feed.

In this manner, PSM 18A is configured to accept a single phase AC input from two independent AC sources (AC power source 30 and AC power source 40). Although the example techniques are illustrated with respect to a single phase AC input, the techniques described in this disclosure may be extended to three-phase AC inputs, or generally to N-phase AC inputs. For instance, in some examples, PSM 18A may be coupled to AC power source 30A and AC power source 40A, PSM 18B may be coupled to AC power source 30B and AC power source 40B, and PSM 18C may be coupled to AC power source 30C and AC power source 40C. In these examples, AC power sources 30A-30C form a three-phase primary AC input, with each one of AC power sources 30A-30C representing a respective phase. AC power sources 40A-40C form a three-phase secondary AC input, with each one of AC power sources 40A-40C representing a respective phase.

In three-phase AC input examples, if one of PSMs 18A-18C switches from a primary AC input to a secondary AC input, the other PSMs 18A-18C also switch from the primary AC input to a secondary AC input, even if the primary AC input is still available. As an example, if power source 30A becomes unavailable, PSM 18A in the three-phase AC input example switches from AC power source 30A to AC power source 40A. In this example, even if power sources 30B and 30C are available, PSM 18B and PSM 18C in the three-phase AC input example switch from AC power source 30B and AC power source 30C to AC power source 40B and AC power source 40C to maintain the three-phase relationship.

In either example (i.e., single phase AC input or three-phase AC input), each AC input of PSM 18A is connected to the input of electromagnetic interference (EMI) filter 50 via contacts of relays 60-130, as illustrated in FIG. 4. In some examples, ATS 16A may be considered as including relays 60-130, as illustrated by the dashed line in FIG. 4. However, examples of ATS 16A are not so limited. For instance, PSM 18A includes relay driver 280, and in some examples, relay driver 280 may be part of ATS 16A. As another example, PSM 18A includes micro-controller unit (MCU) 270. In some examples, rather than one MCU 270, PSM 18A may include two micro-controller units. In these examples, one of the two micro-controller units may be part of ATS 16A. In this sense, ATS 16A within PSM 18A is illustrated conceptually to assist with understanding the techniques described in this disclosure. The example ATS 16A illustrated in FIG. 4 is not the only example of an ATS, and PSM 18A may include other types of ATSs. For instance, PSM 18A may include an ATS such as one described in U.S. application Ser. No. 13/946,916, filed Jul. 19, 2013, and entitled "AUTOMATIC TRANSFER SWITCH SPACING MONITORING WITHIN AN ELECTRICAL DEVICE," the entire contents of which being incorporated by reference.

As one example, relays 60-130 may be the HF140FF012-2HWTF (456) relay Xiamen Hongfa Electroacoustic Co., Ltd. However, the techniques described in this disclosure are not limited to these specific relays and other relays may be utilized.

In general, relays 60-130 may be relays with normally open contacts (i.e., normally opened and need a voltage to close). One of the specifications of relays 60-130 is the operate time, and another specification of relays 60-130 is the release time. The relay operate time is a time that begins when the voltage is applied to the relay coil and ends when the relay wiper arm has reached (without bouncing) the normally open contact. In other words, the operate time is the time necessary to make the relay contact close. The relay release time is a time that starts with the removal of the voltage from the coil and ends when the wiper arm has returned to the normally open contact. In other words, the release time is the time necessary to open a closed relay.

In some examples, the operate time for relays 60-130 may be less than or equal to 15 ms, and the release time for relays 60-130 may be less than or equal to 5 ms. For example, in the worst case scenario, relays 60-130 toggle from an open state to a close state in 15 ms, and in the worst case scenario, relays 60-130 toggle from a close state to an open state in 5 ms.

As an example, assume that relays 60, 70, 100, and 110 are in a close state and relays 80, 90, 120, and 130 are in an open state. In this example, assume that relay driver 280 outputs a signal that causes relays 60, 70, 100, and 110 to open and causes relays 80, 90, 120, and 130 to close. In this case, it may take a maximum of 5 ms for relays 60, 70, 100, and 110 to toggle to the open state, and it may take a maximum of 10 more ms after the 5 ms (i.e., for a total of 15 ms) for relays 80, 90, 120, and 130 to close.

As described in more detail below, in some examples, relay driver 280 includes circuitry that reduces the operate time from less than or equal to 15 ms to less than or equal to 5 ms. In this manner, the techniques further reduce the amount of time it takes PSM 18A to transition from one power feed to another (e.g., the operate time is reduced by 10 ms), which in turn provides additional buffer for the time it takes to ensure that the input current reached zero before the transition from one power feed to another occurs.

The output of EMI filter 50 is connected to the input of diode bridge rectifier 400 that includes diodes 140-170 and silicone-controller rectifiers (SCRs) 290 and 300. As described in more detail, diodes 140 and 150 may initially be part of the conducting circuitry of the diode bridge rectifier, and SCRs 290 and 300 may be de-asserted. However, after PSM 18A reaches steady state (normal operating conditions), diodes 140 and 150 may be decoupled from the conducting circuitry and be replaced by SCRs 290 and 300, respectively (i.e., SCRs 290 and 300 are asserted and form part of the diode bridge rectifier).

The function of the diode bridge rectifier 400 is to convert the negative portions of the AC input to a positive component such that the rectified voltage includes only positive portions. As described in more detail, by asserting and de-asserting SCRs 290 and 300, the techniques described in this disclosure may ensure that PSM 18A transitions from AC power source 30 to AC power source 40, in the event that AC power source 30 becomes interrupted, when the input current has reached approximately zero amperes (Amps or A). For instance, if AC power source 30 becomes interrupted (e.g., unavailable, misses an AC cycle, or due to a brownout), MCU 270 may de-assert SCRs 290 and 300. However, even though SCRs 290 and 300 are de-asserted, SCRs 290 and 300 may still conduct some current. In other words, SCRs 290 and 300 conduct current until the current becomes substantially zero even when SCRs 290 and 300 are de-asserted after being asserted.

After AC power source 30 becomes interrupted, there may be some transient current that is still flowing through ATS 16A. In some examples, there may be a threshold amount of time before such a transient current to reaches zero (e.g., 15 ms as a worst-case scenario). In the techniques described in this disclosure, after MCU 270 determines that AC power source 30 is interrupted, MCU 270 may de-assert SCRs 290 and 300. In this case, although SCRs 290 and 300 are de-asserted, SCRs 290 and 300 may conduct any remaining transient current. The techniques described in this disclosure may wait a threshold amount of time (e.g., 15 ms) and then cause relays 60, 70, 100, and 110 to toggle to an open state, and cause relays 80, 90, 120, and 130 to toggle to a close state so that PSM 18A receives power from power source 40.

For example, MCU 270 may output a signal to SCR control unit 350 that instructs SCR control unit 350 to de-assert the gate voltage on SCRs 290, 300. At the time that MCU 270 instructs SCR control unit 350 to de-assert the gate voltage on SCRs 290, 300, MCU 270 may start a counter that counts to 15 ms. After the counter reaches 15 ms, MCU 270 may output a signal to relay driver 280 that instructs relay driver 280 to cause relays 60, 70, 100, and 110 to toggle to an open state, and cause relays 80, 90, 120, and 130 to toggle to a close state. In some examples, the time it takes relays 60, 70, 100, and 110 to toggle to an open state may be a maximum of 5 ms (the release time) and the time it takes relays 80, 90, 120, and 130 to toggle to a close state may also be a maximum of 5 ms (the operate time) using the techniques described in this disclosure.

In this manner, relays 60, 70, 100, and 110 may open and relays 80, 90, 120, and 130 may close after the input current is guaranteed to have reached zero (e.g., after any remaining transient current has been conducted). By ensuring the input current has reached zero before opening relays coupled to power source 30 and closing relays coupled to power source 40, the techniques may minimize the chances of arching and overvoltage spikes.

As illustrated in FIG. 4, the output of bridge rectifier 400 is connected to the input of active PFC (Power Factor Correction) block 180. PFC 180 converts the rectified AC voltage from bridge rectifier 400 into a DC voltage. For example, PFC 180 may include a capacitor, which is also a bulk capacitor for providing power to the components of the electronic device during transition from one power source to another. The output of PFC 180 is connected to the input of DC/DC converter 190 which generate DC voltage Vout at its output terminals OUT_P and OUT_N that further is distributed to the system components (e.g., components of electronic device 10C such as one or more cards 12). OUT_P may form the positive voltage and OUT_N may form the return ground.

In order to transfer power between two AC power sources 30 and 40 at the moment when AC sine-wave voltage cycles is missing or AC source is in brownout state, and also in order to switch back to the AC power source in a case where its power is restored, PSM 18A includes input voltage sensors 220 and 230 to sense voltage across L1/N1 and L2/N2, respectively, and current sensors 240 and 250 to sense current outputted via L1 and L2, respectively. Although both voltage sensors and current sensors are illustrated, the techniques described in this disclosure may not require both voltage and current sensors, and may function with either voltage sensors or current sensors.

Voltage sensor 220 and current sensor 240 may be configured to output a signal indicative of an AC voltage or an AC current, respectively, at a connection of power supply source 30 to PSM 18A to MCU 270. MCU 270 may receive the signal indicative of the AC voltage or AC current and determine whether power from power source 30 is unavailable. For example, MCU 270 may determine that power from power source 30 is unavailable when one or both of the AC voltage or AC current is less than a threshold. MCU 270 may similarly determine whether power from power source 40 is unavailable based on signals received from voltage sensor 230 and current sensor 250. For example, MCU 270 may receive the outputs of all input voltage and current sensors.

One of the outputs of MCU 270 is connected to the relay driver unit 280 to switch on/off respective relays 60-130. In some examples, rather than being implemented separately, one or more of relays 60-130 may be implemented together in a common set of relays. For example, a first set of relays may include both relay 60 and relay 80, a second set of relays may include both relay 70 and relay 90, a third set of relays may include both relay 100 and 120, and a fourth set of relays may include both relay 110 and 130. In this example, the first, second, third, and fourth sets of relays may be configured such that when the relays receive a signal from relay driver unit 280 one of the relays closes and the other opens in response to the single signal from delay driver unit 280. As one example, if the first set of relays received a digital high, the first set of relays may close relay 60 and open relay 80, and if the first set of relays received a digital low, the first set of relays may open relay 60 and close relay 80. In this way, relays 60-130 may open and close as needed with a single output from relay driver unit 280, rather than two different signals (one for opening or closing relays 60, 70, 100, and 110, and other signal for opening or closing relays 80, 90, 120, and 130), which reduces the chances of relays 60-130 not opening or closing as needed. For example, the sets of relays coupled to two AC inputs (e.g., AC power source 30 via L1/N1 and AC power source 40 via L2/N2) may be driven from one coil, which may reduce or eliminate the possibility of incorrect relay switchover shorting two sources.

Also, ATS 16A is illustrated as including relays 60 and 70 in series and relays 100 and 110 in series for AC power source 30, and relays 80 and 90 in series and relays 120 and 130 in series for AC power source 40. Such series connection further reduces the chances of creating a current path between AC power source 30 and AC power source 40. For example, if there was only one relay (rather than two in series) and this single relay malfunctions, there may be current path via arching between AC power source 30 and AC power source 40. However, the chances that both relays in series will malfunction simultaneously may be much lower than the chance that a single relay will malfunction. Accordingly, by connecting the relays in series within ATS 16A, the chances of AC power source 30 and AC power source 40 coupling may be minimized. In other words, in order to meet safety requirement for telecommunication equipment and rule out major safety hazard in case if relay fails shorted each input AC line connection has two relays connected in series. For instance, two relays in series in each input may avoid safety hazard in case one relay fails. The pairs of these relays are as follow: 60-70, 80-90, 100-110, and 120-130.

The techniques described in this disclosure may keep the transfer time (e.g., time to transition from one power feed to another) within a holdup time of the PSM (e.g., less than 40 ms). By keeping the transfer time relatively short (e.g., 40 ms), the techniques allow for a smaller sized bulk capacitor in PFC 180 as compared to the capacitor needed for a longer transfer time. For example, as described above, the capacitor in PFC 180 may deliver power to components of electronic device 10C during the transfer from one power source to another. The size of the capacitor may be proportional to the transfer time (e.g., the longer the transfer time the larger the capacitor, the shorter the transfer time the smaller the capacitor). A smaller sized capacitor is generally preferable because the smaller sized capacitor requires smaller space allowing for smaller sized PSMs 18 and because the smaller sized capacitor costs less.

In the techniques described in this disclosure, in order to avoid arcing at relay contacts, to avoid overvoltage spikes, and to increase reliability of mechanical relays 60-130 during transferring process, PSM 18A includes two SCRs 290, 300, auxiliary relay 310, with series resistor 320, voltage sensor 330, current sensor 340, and SCR control unit 350. Voltage sensor 330 and current sensor 340 sense voltage and a current at the input of diode rectifier bridge 140-170. Output voltage sensor 360 is to sense the Vout (e.g., voltage across OUT_P and OUT_N) and provide this information to the MCU 270. Voltage sensor 330, 360 and current sensor 340 may not be needed in every example and are provided for purposes of illustration only.

In some examples, MCU 270 may receive a signal indicative of the voltage from the voltage sensor 360 and determine when to transition from power source 30 to power source 40. For example, as described above, when power source 30 becomes unavailable, the bulk capacitor in PFC 180 delivers power to the components of electronic device 10C. The length of time that the bulk capacitor can deliver power is a function of the output load. For instance, if cards 12 do not require much power, the bulk capacitor can deliver power for longer than if cards 12 required a great amount of power.

As the bulk capacitor delivers power, the voltage at the output of PSM 18A (e.g., across OUT_P, OUT_N) begins to droop down. The time when the voltage at the output of PSM 18A begins to droop and the rate at which the voltage at the output of PSM 18A droops may be a function of the amount of power that the one or more components need. In some examples, MCU 270 may determine based on the signal from voltage sensor 360 the rate of the droop on the output voltage and the level of the output voltage.

If the rate of the droop on the output voltage is relatively slow, MCU 270 may determine that transitioning from power source 30 to power source 40 can be delayed because the bulk capacitor is capable of providing power for a longer time. In this case, if power from power source 30 is restored during the additional delay in transitioning, no transitioning from power source 30 to power source 40 is needed, which extends the lifetime of ATSs 16. If the rate of the droop on the output voltage is relatively fast, MCU 270 may determine that transitioning from power source 30 to power source 40 may need to be done earlier because the bulk capacitor may not be capable of providing power for much longer.

Examples of MCU 270 include, but are not limited to, one or more digital signal processors (DSPs), general purpose microcontrollers, application specific integrated circuits (ASICs), field programmable logic arrays (FPGAs), or other equivalent integrated or discrete logic circuitry. In some examples, MCU 270 may receive power from AC source 30 and AC source 40 or from the output of DC/DC converter 190. In some examples, MCU 270 of PSM 18A may also receive power from the Vouts of other PSMs 18. In this manner, if there is a fatal defect in the electrical components of PSM 18A, MCU 270 may still receive power from other functioning PSMs 18.

In some examples, MCU 270 may be configured to record events within PSM 18A. As one example, MCU 270 may be configured to record the number of times the relays of ATS 16A toggled. As another example, MCU 270 may record the number of times AC power source 30 or AC power source 40 became unavailable. MCU 270 may record other such information that is generally indicative of the operational characteristics of PSM 18A. MCU 270 may output such information to electronic device 10C (e.g., one or more processors of electronic device 10C). Electronic device 10C may assert an alarm if the received information indicates a potential error or that a component is operating at below specification levels in PSM 18A. For example, if the received information indicates that the relays are close to the maximum number of toggle times, electronic device 10C may assert an alarm indicating that PSM 18A should be replaced.

In the example illustrated in FIG. 4, the output of both voltage and current sensors connected to the respective inputs of MCU 270 while one of the MCU 270 output is connected to the input of SCR control unit 350. The output of SCR control unit 350 is connected to the gates of SCR 290, 300 and a coil of relay 310.

Figure 5:
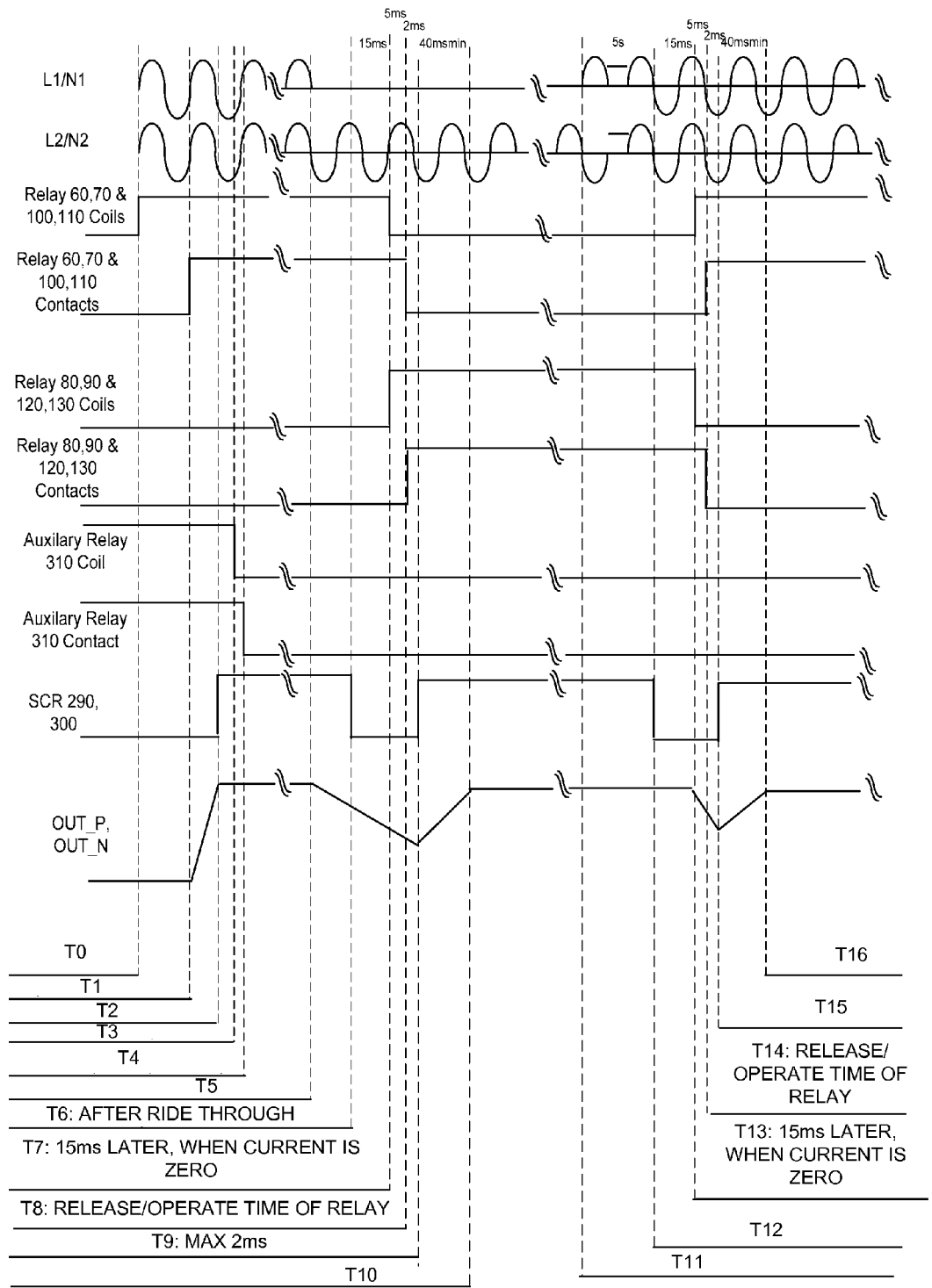
FIG. 5 is a timing diagram illustrating techniques in accordance with one or more examples described in this disclosure.
Figure 6:
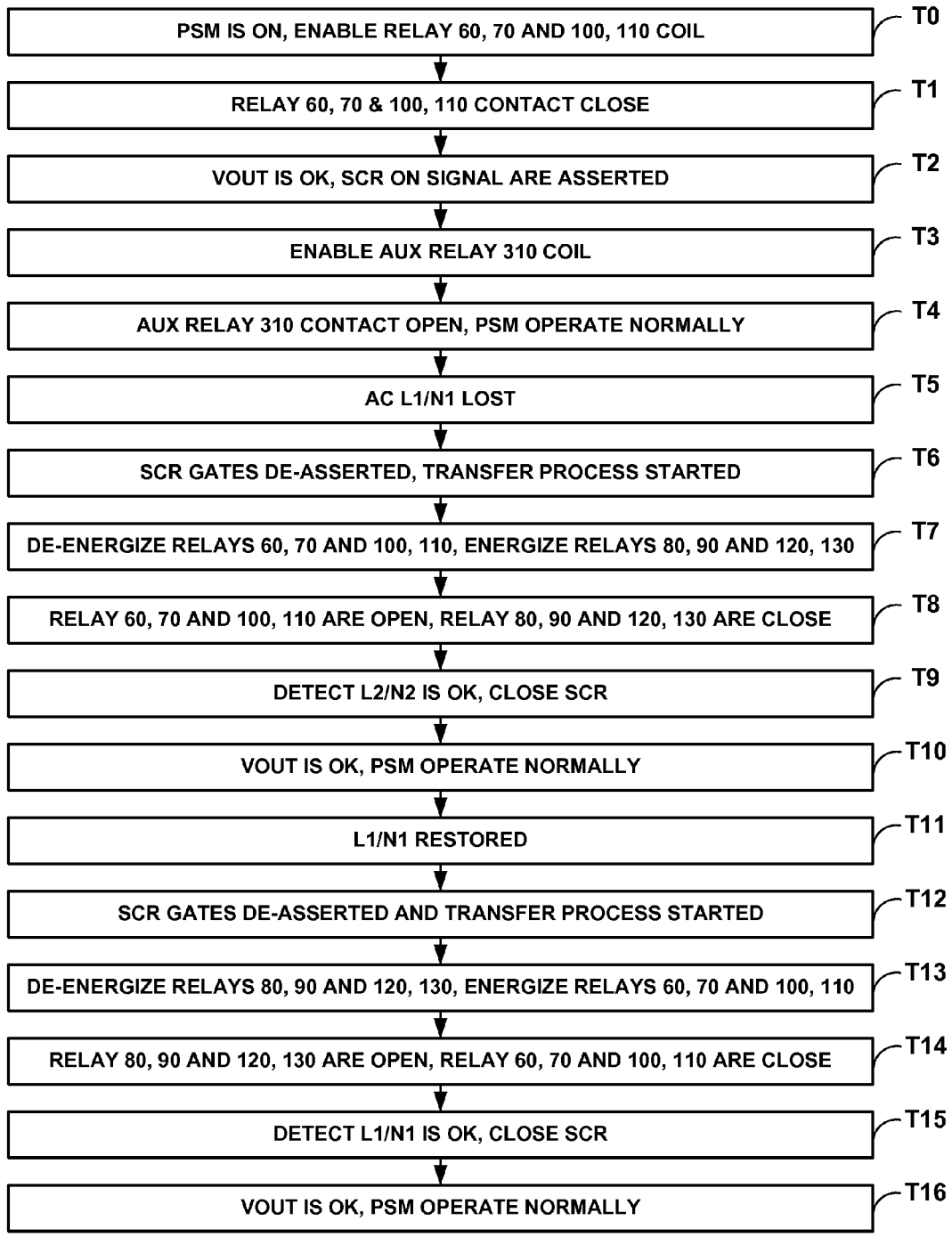
FIG. 6 is a flowchart illustrating the corresponding timing in FIG. 5.

FIG. 5 is a timing diagram illustrating techniques in accordance with one or more examples described in this disclosure. FIG. 6 is a flowchart illustrating the corresponding timing in FIG. 5. FIGS. 5 and 6 should be consulted together as FIG. 6 provides additional context for the timing diagram of FIG. 5. For purposes of illustration, the techniques are described with respect to FIG. 4.

Assume that initially AC power source 30 is connected to the input L1/N1 of PSM 18A while AC power source 40 is connected to the input L2/N2 of PSM 18A. At start up cycle of PSM 18A, at time T0, MCU 270 enables voltage to the coils of respective relays to prepare PSM 18A being connected to the default input. In this example L1/N1 of AC power source 30 is consider as default one. For instance, at time T0, MCU 270 enables voltage to the coil of relays 60, 70, 100, 110 to close relays 60, 70, 100, and 110. At time T1 (e.g., approximately 5 ms after time T0), the contacts of relays 60, 70, 100, 110 close and AC voltage from L1/N1 is connected to the input of EMI filter 50. After that PSM 18A starts operating as any conventional AC/DC PSM. For instance, at time T1, Vout voltage on output OUT_P, OUT_N ramps up as the capacitor within PFC 180 charges up.

Auxiliary relay 310 may be relay with normally closed contacts, which means that if no voltage is applied to relay 310, relay 310 connects resistor 320 to diode 140 and 150. At time T1, while the Vout voltage is ramping up, MCU 270 causes SCR control unit 350 to not assert a voltage to relay 310 keeping resistor 320 connected in the current path. Also, at time T1, SCR control unit 350 may not assert a voltage to SCRs 290, 300 keeping SCRs 290, 300 from conducting current.

Series resistor 320 limits PSM 18A inrush current. For example, at start-up there may be rush of current into PSM 18A, and resistor 320 limits such an inrush current. Also, during this time, all voltage and current sensors monitor respective voltages and current. At time T2, the output voltage sensor 360 may signal to MCU 270 that transition process of ramping up of Vout is completed and Vout reached its stable value. MCU 270 may generate control signal to the SCR control unit 350 that in turn asserts control signal on its outputs to turn SCRs 290, 300 on (e.g., assert a voltage on the gates of SCRs 290, 300). At time T3, SCR control unit 350 asserts signal to the coil of auxiliary relay 310 to cause relay 310 to open.

At time T4, relay 310 opens. Accordingly, at time T4, SCRs 290, 300 are on and series resistor 320 is no longer connected (i.e., bypassed). When series resistor 320 is not connected and SCRs 290, 300 are on, SCRs 290, 300 bypass diodes 140, 150. In other words, open contact of relay 310 takes resistor 320 and diodes 140, 150 out of the current (i.e., conducting) path. The PSM 18A now operates in normal condition from AC source 30 as long as voltage sensor 220 senses proper voltage on L1/N1 (e.g., provides its N+1$^{th}$ amount of power for the components of electronic device 10C).

At time T5 (which is at some time later), AC input L1/N1 is lost (either missing cycle or brownout condition for AC power source 30). Voltage sensor 220 on L1/N1 senses this condition and provides this information to MCU 270. Because AC input L1/N1 is lost, Vout voltage starts decaying down. During this time PSM 18A continues supplying energy to the output converting energy stored in bulk capacitor on output of PFC 180 inside of PSM 18A. Because PFC voltage is about 380-400 VDC this capacitor stores enough energy to supply output voltage during necessary holdup time. As the capacitor discharges, the Vout voltage starts decaying down (e.g., droops), as illustrated by the decaying on the OUT_P, OUT_N line in FIG. 5.

As described above, the rate at which the voltage at the output of PSM 18A (i.e., Vout) begins to droop (i.e., decay) may be a function of the amount of power that the one or more components need. In other words, the Vout voltage decaying down slew rate depends on PSM 18A external load. As one example, if there is no heavy network traffic at the time, the PSM load may be relatively light. Accordingly, the amount of time that the bulk capacitor can provide power may be variable. The amount of time that the bulk capacitor can deliver power may be referred to as a ride through period because the ride through period defines how long power to electronic device 10C can be delivered before back up power is needed. For instance, the ride through period defines a tolerable delay after power from the primary power source becomes unavailable and power from the backup power source is needed.

If the slew rate of the Vout voltage decaying relatively slow, then the ride through period may be longer than if the Vout voltage decaying slew rate is relative fast. In some examples, MCU 270 may continuously calculate the ride through period after power from power source 30 is interrupted to determine when to begin the transition from power source 30 to power source 40. The ride through period may also be referred to as a holdup time (Tholdup).

MCU 270 may utilize the following equation to determine the ride through period (i.e., the holdup time or Tholdup):

$$Tholdup = \frac{\eta * Cbulk * [(Vout)^2 - (Vdropout)^2]}{2 * Pout}$$

In the above equation, Tholdup is the ride through period (i.e., the amount of time after time T5 that MCU 270 can wait before transitioning from power source 30 to power source 40). In other words, MCU 270 may transition from power source 30 to power source 40 based on the determined ride through period. The variable η is PSM efficiency, Cbulk is the value of the bulk capacitor of PFC 180, Vout is the nominal value of the output voltage, Vdropout is the minimum value of the output voltage Vout that allows electronic device 10C to operate properly. Pout is the PSM actual output power drawn at the time.

In the above equation, the holdup time (i.e., ride through period or Tholdup) is inversely proportional to Pout. Accordingly, when power from power source 30 is unavailable at time T5, MCU 270 determines the expected holdup time using the above equation. MCU 270 may continuously determine the expected holdup time and make corrections of the starting point time of when to transition from power source 30 to power source 40.

In some examples, instead of determining the ride through period on the fly (i.e., by continuously calculating the holdup time), MCU 270 may be preconfigured with a ride through period (e.g., preconfigured with a ride through period of 16 ms). In the case of a predetermined ride through period, although MCU 270 may not need to continuously determine the ride through period, there may be some drawbacks. For example, with a predetermined ride through period, MCU 270 may transition from power source 30 to power source 40 too quickly (i.e., there may be sufficient power in the bulk capacitor to keep delivering power when MCU 270 transitions from power source 30 to power source 40). In some examples, power source 30 may become available, but MCU 270 may have already and unnecessarily transitioned to power source 40. Utilizing the above equation to determine the ride through period on the fly, the techniques may drastically reduce the number of unnecessary transfer events, which results in increase reliability of the ATS and the entire PSM.

After the ride through period (e.g., as determined by MCU 270 or predetermined), at time T6, MCU 270 asserts signal to SCR control unit 350 to cause SCR control unit 350 to de-assert the gate voltage on SCRs 290, 300 causing SCRs 290, 300 to turn off. In some examples, MCU 270 may determine the ride through period to avoid transitioning from AC power source 30 to AC power source 40 in case power via AC power source 30 returns. For example, AC power source 30 may be interrupted for a brief time, and switching over may not be needed.

At time T6, after MCU 270 and SCR control unit 350 de-assert SCR 290, 300 (e.g., with control signals to the gates of SCRs 290, 300), current may still continue flowing through SCRs 290, 300, as this is a characteristic of SCRs. Because SCRs 290, 300 gate signal is no longer active, input sine wave current flowing through either SCR 290 or SCR 300 will be interrupted once the current crosses zero point. At this moment SCRs 290, 300 are in open state.

In other words, there is a holding current level associated with SCRs 290, 300. Even if MCU 270 and SCR control unit 350 de-assert SCRs 290, 300, SCRs 290, 300 still conduct current until the current through SCRs 290, 300 falls below the holding current level. In some examples, it may take up to 15 ms from the time that SCR control unit 350 de-asserts SCRs 290, 300 for the current through SCRs 290, 300 to reach zero (fall below the holding current level). For instance, it may take up to 15 ms from the time that SCRs 290, 300 are turned off for the input current to reach zero, but the actual amount of time it takes the input current to reach zero may be random (but less than 15 ms).

At time T7 (e.g., 15 millisecond later of T6 to guarantee that the input current reached zero), MCU 270 may output a signal to relay driver 280 causing relay driver 280 to de-energize coils of relays 60, 70, 100, and 110 (e.g., cause relays 60, 70, 100, and 110 to go into an open state) and energize coils of relay s80, 90, 120, and 130 (e.g., cause relays 80, 90, 120, and 130 to go into a close state). For example, at time T6, MCU 270 may start a counter, and when the counter indicates that 15 ms have elapsed, MCU 270 may output the signal to relay driver 280 to cause relays 60, 70, 100, and 110 to open and cause relays 80, 90, 120, and 130 to close.

Accordingly, the contacts of relays 60, 70, 100, 110 go from close state to open state when current through these contacts is zero because SCR 290 and SCR 300 were turned off early and interrupted input current. This allows avoiding relay contacts arcing, increase relay reliability, and avoid input overvoltage spikes.

At time T8 (e.g., 5 millisecond later) contacts of relay 60, 70, 100, and 110 are open disconnecting PSM 18A from L1/N1 (e.g., from AC power source 30), and contacts of relays 80, 90, 120, 130 are close connecting PSM 18A to L2/N2 (e.g., to AC power source 40). Thus, PSM 18A again is connected to the AC source. At time T9 when voltage sensor 230 coupled to L2/N2 detects right value of voltage from AC power source 40 (e.g., approximately 2 ms after time T8), MCU 270 and SCR control unit 350 asserts signal to the gates of SCRs 290, 300 turning them on creating path for the input current from AC power source 40. This causes PSM output voltage (Vout) to start ramping up to its normal operating level (i.e., nominal value).

In this example, assuming 16 ms for the determined ride through period, the total transfer time from AC source 30 to AC source 40 is about 38 milliseconds (e.g., 16 ms for ride through period plus 15 ms to ensure current through SCRs reach zero plus 5 ms to toggle the relays plus 2 ms for detecting power at L2/N2 is correct). During this transfer time bulk capacitor on the output of PFC 180 provides energy to the output to keep the output voltage within specified range in order to maintain uninterruptable operation of entire telecommunication system. At time T10 the output voltage reached its nominal value and PSM 18A continues normal operation from AC power source 40 until the voltage from failed AC power source 30 is restored to its nominal value.

At some time T11, when voltage from AC power source 30 is restored to its nominal condition ATS 16A initiates transfer back from AC power source 40 to the default, main AC power source 30 (i.e., transitions from the secondary power feed to the primary power feed). The transfer back processes are similar to the above described process for transferring to the secondary power feed. At time T11, input voltage sensor 220 starts sensing proper voltage on L1/N1, and signals information indicating that the voltage across L1/N1 is at the correct level to MCU 270. In some examples, in order to make sure that voltage on L1/N1 is indeed restored, MCU 270 waits for a restore period (e.g., approximately 5 seconds) and then along with relay driver unit 280 at time T12 (e.g., approximately 5 seconds after T11) de-asserts SCRs 290, 300 to begin the transfer back process.

Waiting for the restore period is not necessary in every example. The purpose for waiting for the restore period is to not switch unnecessarily until there is some assurance that AC power source 30 is fully functioning. For instance, if MCU 270 immediately transitioned from AC power source 40 back to AC power source 30, and AC power source 30 was not fully restored, then MCU 270 may immediately transition from AC power source 30 back to AC power source 40. Such a process may potentially repeat multiple times causing chatter. By waiting for the restore period, the techniques may minimize such chatter. Moreover, the number of times the relays can toggle from one position to another may be fixed. For instance, relays 60, 70, 100, and 110, and 80, 90, 120, and 130 may be mechanical relays, and repetitive toggling of the mechanical relays may speed the end of life of the mechanical relays.

At time T13, which approximately 15 ms after time T14 to ensure that the input current is at zero, MCU 270 causes relay driver 280 to de-energize the coils of relays 80, 90, 120, and 130 (cause relays 80, 90, 120, and 130 to open) and energize the coils of relays 60, 70, 100, and 110 (cause relays 60, 70, 100, and 110 to close). At time T14, approximately 5 ms after time T13, relays 80, 90, 120, and 130 open and relays 60, 70, 100, and 110 close.

At time T15 voltage sensor 230 confirms that input L1/N1 is correct and MCU 270 along with SCR control unit 350 assert on voltage to SCR 290, 300 gates turning them on approximately 2 ms after time T14. The output of PSM 18A starts ramping up again and roughly reaches its nominal steady value in 40 millisecond. At time T16 Vout voltage is correct and PSM 18A operates again normally from main default AC power source 30 over input L1/N1.

In this manner, the techniques described in this disclosure are related to an N+1 PSM and 1+1 source redundancy system without any single point of failure. Also, the transition from one power source to another occurs during zero current through the relays (i.e., zero current relay transfer).

Moreover, in case of transfer to backup power, the PSM may not transfer back to the primary input for a predetermined time (e.g., restore period such as 5 seconds) unless the backup input goes down, which reduces chatter and increases reliability. In some examples, MCU 270 may determine a ride through period, and wait for the determined ride through period before starting the source switch over.

In some examples, the techniques may drive one set of relays in two AC inputs from one coil. This may eliminate or reduce possibility of incorrect relay switchover shorting two sources.

In some examples, the MCUs of respective PSMs 18 may also be powered by the bias from common output voltage bus from the system (e.g., the MCU of one of PSMs 18 may receive power from another one or more of PSMs 18). In this manner, status information, such as ATS status communication, to the system may never go down even if there is no AC input to the PSM. In some examples, ATS transfer events may be recorded and communicated to the system (a processor of electronic device 10C). The system may raise alarm to get a PSM replace if the events get close to the maximum transfer specification of the relays.

In the above techniques, to ensure that transition from a first power source to a second power source occurs when input current is low (e.g., approximately zero), SCRs 290, 300 de-couple components of electronic device 10C from receiving power from the first power source prior to ATS 16A de-coupling PSM 18A from receiving power from the power source. For example, during normal operation, one or more components of electronic device 10C receive DC power converted from AC power of power source 30. Then, when the power from power source 30 is lost, MCU 270 de-assert SCRs 290, 300 prior to toggling relays of ATS 16A. Therefore, prior to relays of ATS 16A de-coupling PSM 18A from power source 30, SCRs 290, 300 de-couple components of electronic device 10C from receiving power from power source 30. Such de-coupling of the components of electronic device 10C from power source 30 ensures that the input current (i.e., current flowing into PSM 18A) is given sufficient time to fall to a low amplitude (e.g., approximately 0A). Then, when the input current is approximately zero, MCU 270 toggles the relays of ATS 16A to de-couple PSM 18A from power source 30 and couple PSM 18A to power source 40.

In this sense, SCRs 290, 300 may be considered as de-coupling components (e.g., de-coupling components of a bridge rectifier) that de-couple a first power source from components of an electronic device before an ATS de-couples a power supply module from the first power source. However, SCRs 290, 300 are not the only example of coupling components, and other examples of coupling components may be utilized. Furthermore, these coupling components need not necessarily reside in a bridge rectifier, and the inclusion of SCRs 290, 300 in bridge rectifier 400 is provided for purposes of illustration only. Also, PSMs 18 need not necessarily include two coupling components, and may instead include one or more coupling components that de-couple a first power source from components of an electronic device before an ATS de-couples a power supply module from the first power source.

In other words, in the techniques described in this disclosure, one or more components (e.g., cards 12) of electronic device 10C are connected to an output of PSM 18A (e.g., OUT_P, OUT_N of PSM 18A via the common Vout bus). The one or more decoupling components (e.g., SCRs 290, 300) of PSM 18A connect ATS 16A to the output of PSM 18A. For example, in normal operation, for current to flow from the ATS 16A to the output of PSM 18A (OUT_P, OUT_N), the current flows through SCRs 290, 300. In this way, the one or more decoupling components may be considered as connecting ATS 16A of PSM 18A to the output of PSM 18A.

Accordingly, in the techniques described in this disclosure, MCU 270 of PSM 18A may determine whether power from power source 30 is unavailable to PSM 18A (e.g., based the signal received from AC voltage sensor 220 and/or AC current sensor 240). Responsive to determining that power from power source 30 is unavailable, MCU 270 may cause the one or more de-coupling components (e.g., SCRs 290, 300) to de-couple the one or more components of electronic device 10C that are connected to the output of PSM 18A (e.g., cards 12) from power source 30. For example, the one or more de-coupling components may stop receiving power from power source 30.

For instance, in normal operation, a rectified version of the AC output of power source 30 charges the bulk capacitor that delivers power to one or more components of electronic device 10C that are connected to the output of PSM 18A. In this way, the one or more components of electronic device 10C indirectly receive power from power source 30. In the techniques described in this disclosure, when power from power source 30 becomes unavailable, the one or more de-coupling components de-couple the one or more components of electronic device 10C connected to the output of PSM 18A from receiving power from power source 30.

Subsequent to causing the one or more de-coupling components to de-couple power source 30 from the one or more components of electronic device 10C, MCU 270 may cause ATS 16A to de-couple PSM 18A from power source 30. For example, MCU 270 may wait until the current through the de-coupling components (e.g., SCRs 290, 300) is approximately zero before causing ATS 16A to de-couple PSM 18A from power source 30. MCU 270 may cause ATS 16A to couple PSM 18A to power source 40 for delivering power to the one or more components of electronic device 10C.

Figure 7A:
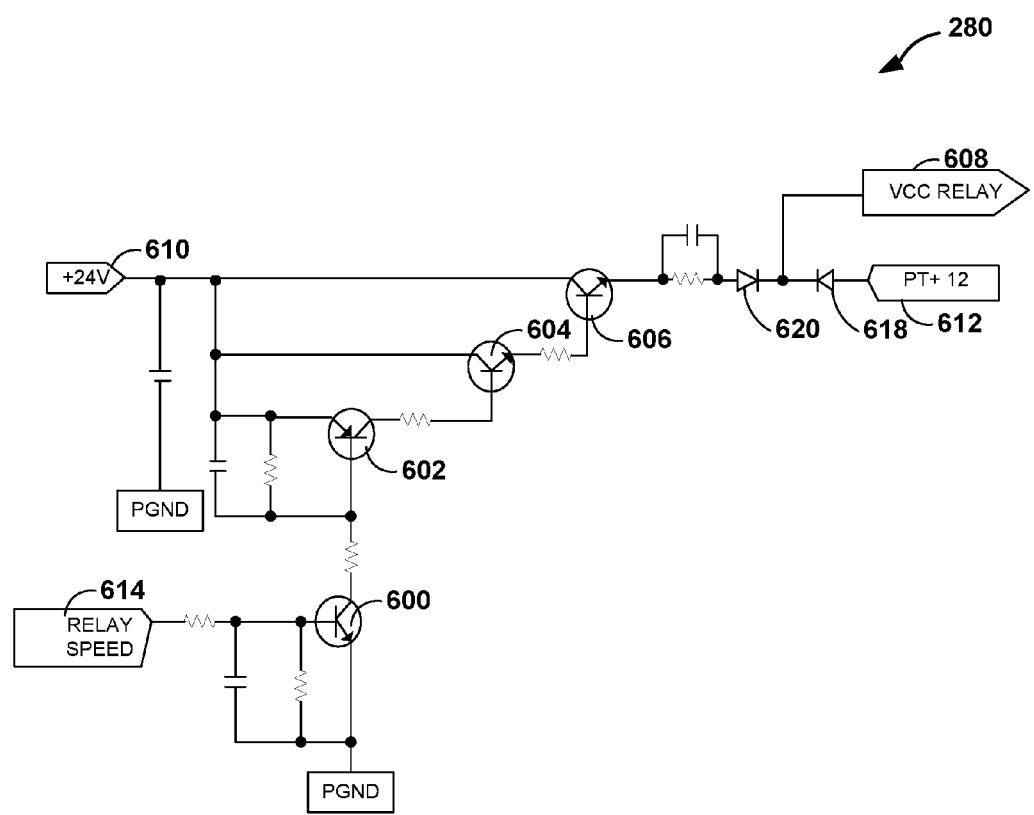
FIG. 7A is a block diagram illustrating an example of a relay driver of a power supply module.

FIG. 7A is a block diagram illustrating an example of a relay driver of a power supply module. For instance, FIG. 7A illustrates an example of relay driver 280 of PSM 18A of FIG. 4 in greater detail. Relay driver 280 may drive relays 60, 70, 100, and 110, and relays 80, 90, 120, and 130. For purposes of illustration, relay driver 280, in FIG. 7A, is illustrated as driving one of the relays of ATS 16A. For instance, output 608 of relay driver 280, in FIG. 7A, may drive relay 60. Relay driver 280 may include similar circuitry for driving the other relays as well. For purposes of illustration and brevity, the example illustrated in FIG. 7A is described with respect relay driver 280 driving relay 60.

As described above, the operate time (time it takes to close) for relay 60 may usually be less than or equal to 15 ms and the release time (time it takes to open) for relay 60 may usually be less than or equal to 5 ms. With the circuitry of relay driver 280, illustrated in FIG. 7A, the operate time for relay 60 may be reduced to less than or equal to 5 ms, and the release time may remain at less than or equal to 5 ms.

Relay 60 may be configured to operate at a first voltage level (e.g., 12V). For instance, when 12V is applied to relay 60, relay 60 toggles from the normally open state to the close state, and when 12V is removed from relay 60, relay 60 toggles from the close state to the open state. When relay 60 operates at the first voltage level, the operate time and release time for relay 60 may be specified operate time and release time (e.g., ≤15 ms for the operate time and ≤5 ms for the release time).

If relay driver 280 applies a second voltage level greater than the first voltage level to relay 60, then the operate time for relay 60 may be reduced. For example, if relay driver 280 applies 24V to relay 60, then relay 60 may toggle from the open state to the close state in less than or equal to 5 ms (e.g., the operate time is reduced from worst case 15 ms to worst case 5 ms). However, it may undesirable to apply the second voltage level to relay 60 for an extended period of time because applying the second voltage level to relay 60 may cause relay 60 to burn out.

Accordingly, the circuitry of relay driver 280, illustrated in FIG. 7A, may apply a second voltage level to relay 60 for brief instance and then revert back to applying a first voltage level to relay 60 so that the operate time of relay 60 is reduced, but the chances of damaging relay 60 is reduced. For example, when MCU 270 determines that relay 60 should toggle to the close state, relay driver 280 may apply a first voltage level to voltage input 612 (e.g., apply 12V to input 612). In addition, relay driver 280 or MCU 270 may apply a voltage pulse to relay speed input 614. The pulse width of the voltage pulse may be in the order of milliseconds (e.g., approximately 10 ms). Voltage input 610 may be coupled to a second voltage level (e.g., 24V) permanently or whenever relay driver 280 applies the first voltage level to voltage input 612 or whenever relay driver 280 or MCU 270 apply a voltage pulse to relay speed input 614.

In normal operation when no pulse is applied to relay speed input 614, transistors 600, 602, 604, and 606 may be off. Because transistor 606 is off, transistor 606 blocks the second voltage level (e.g., 24V at voltage input 610) from being applied to output 608. Then, when it is time to toggle relay 60 to the close state, relay driver 280 applies the first voltage level (e.g., 12V) to voltage input 612 and relay driver 280 or MCU 270 applies a voltage pulse to relay speed input 614.

During the on-time of the voltage pulse (e.g., the 10 ms pulse width), the voltage pulse turns on transistor 600, which turns on transistor 602, which turns on transistor 604. Turning on transistor 604 turns on transistor 606, and the second voltage level at voltage input 610 applies voltage to relay 60 via output 608 (e.g., applies 24V to relay 60 via output 608). Diode 618 blocks current from flowing from voltage input 610 to voltage input 612. In this case, relay 60 toggles from the open state to the close state in less than or equal to 5 ms because 24V is applied to relay 60.

After the on-time of the voltage pulse (e.g., when the voltage at relay speed input 614 is approximately zero), transistor 600 turns off, which causes transistor 602 to turn off, which causes transistor 604 to turn off, which then causes transistor 606 to turn off. When transistor 606 is off, the second voltage level at voltage input 610 is blocked from being applied to relay 60, and instead the first voltage level at voltage input 612 is applied to relay 60.

Accordingly, relay driver 280 may briefly apply a voltage that causes the relays to transition from the open state to a close state, and then apply a lower voltage that causes the relays to stay in the close state. In this manner, the operate time of relay 60 may be reduced, but the chances of damaging relay 60 is limited. Also, when relay 60 is to return back to the open state, relay driver 280 may remove the voltage at voltage input 612. Therefore, there may be no effect on the release time of relay 60.

Figure 7B:
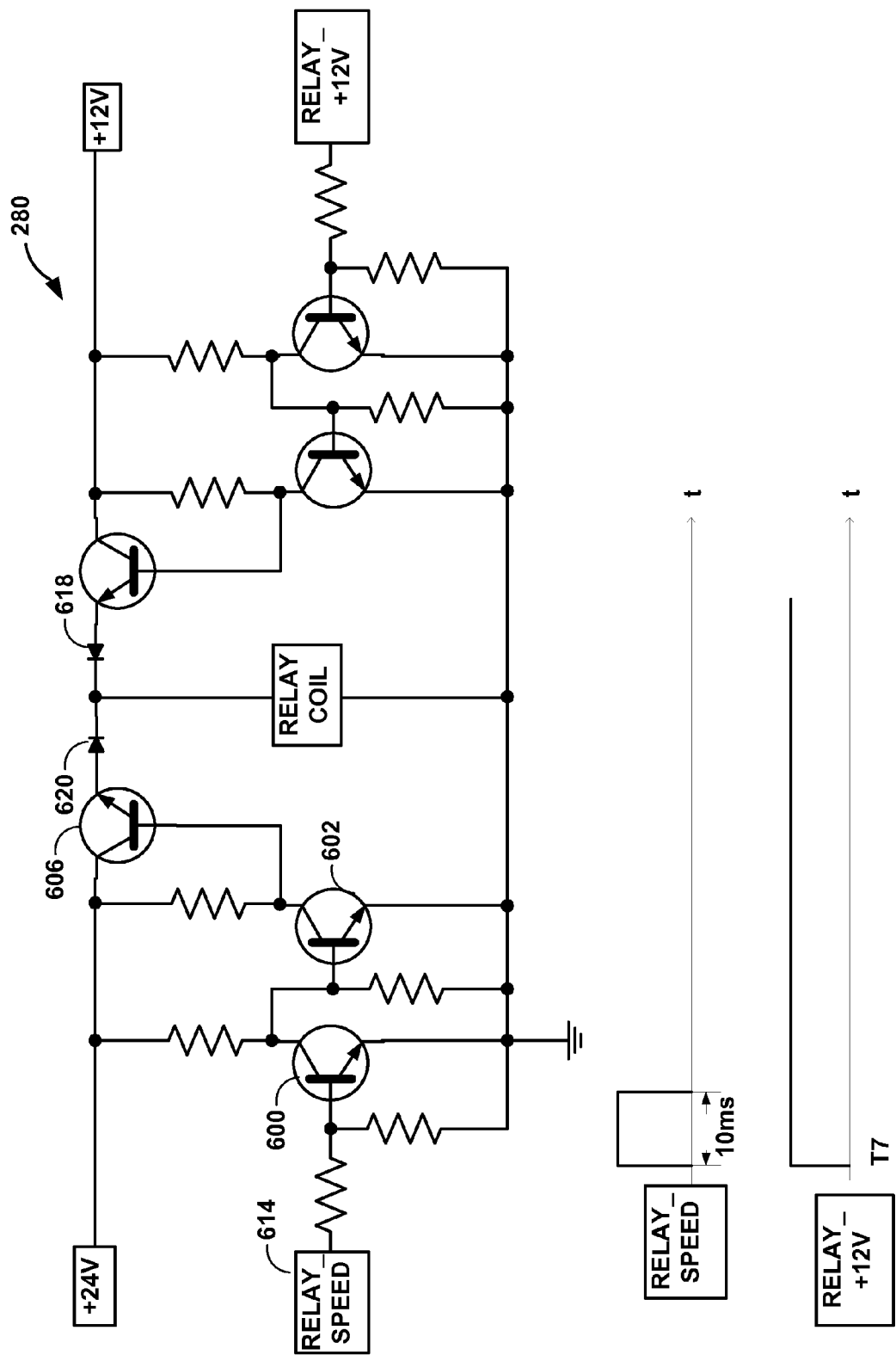
FIG. 7B is a block diagram illustrating another example of a relay driver of a power supply module.

FIG. 7B is a block diagram illustrating another example of a relay driver of a power supply module. FIG. 7B is similar to FIG. 7A, and similar components are referenced with the same numerical references. FIG. 7B further provides a timing diagram which further illustrates the timing at time T7 to illustrate how fast the coils energize and de-energized.

Figure 8:
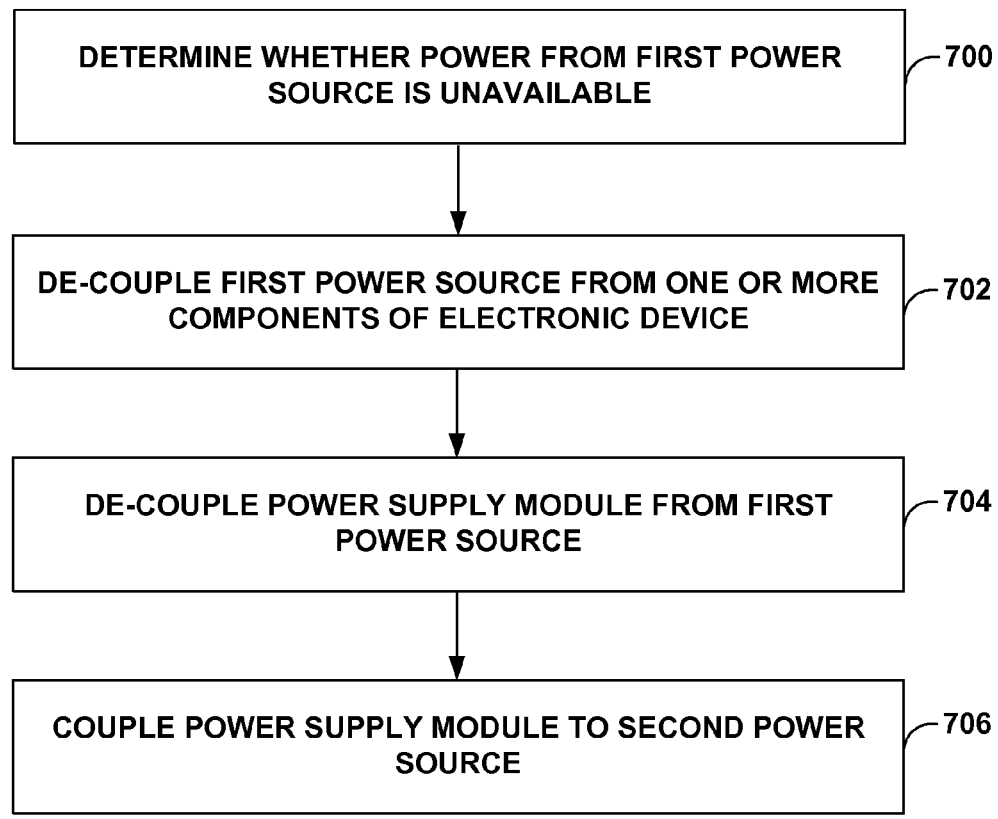
FIG. 8 is a flowchart illustrating an example in accordance with one or more techniques of this disclosure.

FIG. 8 is a flowchart illustrating example operation of a power supply module in accordance with one or more techniques of this disclosure. For purposes of illustration, reference is made to micro-controller 270 of PSM 18A of FIG. 4.

As illustrated in this example, a controller (e.g., micro-controller 270) of a power supply module (e.g., PSM 18A of electronic device 10C) may determine whether power from a first power source (e.g., AC power source 30) is unavailable to the power supply module (700). For example, at least one of voltage sensor 220 and current sensor 240 may measure an AC voltage or an AC current, respectively, at a connection of AC power source 30 to PSM 18A. Micro-controller 270 may receive a signal indicative of the AC voltage or AC current and determine that power from AC power source 30 coupled to PSM 18A is unavailable when one or both of the AC voltage and AC current is less than a threshold.

The controller may be configured to cause one or more de-coupling components of the power supply module that connect an automatic transfer switch (ATS) of the power supply module to an output of the power supply module to de-couple the first power source from the one or more components of the electronic device that are connected to the output of the power supply module in response to determining that the first power source is unavailable (702). For example, the one or more de-coupling components may be SCRs (e.g., SCRs 290, 300), and micro-controller 270 may cause SCR control unit 280 to de-assert the SCRs to de-couple the first power source from the one or more components of the electronic device that are connected to the output of PSM 18A (e.g., cards 12 connected via the common Vout bus to PSM 18A). In some examples, the SCRs may be part of a bridge rectifier 400, where the bridge rectifier is configured to convert negative portions of an AC power of the first power source to positive portions.

The controller may be configured to cause the ATS to de-couple the power supply module from the first power source subsequent to causing the one or more de-coupling components to de-couple the first power source from the one or more components of the electronic device (704). For example, micro-controller 270 may be configured to cause relay driver 280 to toggle one or more relays (e.g., relays 60, 70, 100, and 110) of ATS 16A from a close state to an open state to cause ATS 16A to de-couple PSM 18A from the first power source. In some example, micro-controller 270 may be configured to wait until current through the one or more de-coupling units is ensured to be approximately zero before causing ATS 16A to de-couple PSM 18A from the first power source.

The controller (e.g., micro-controller 270) may be con-figured to cause ATS 16A to couple PSM 18A to the second power source (e.g., power source 40) (706). In this manner, one or more components 12 of electronic device 10C may receive power from power source 40 when power from power source 30 is unavailable. Micro-controller 270 and the other components of PSM 18A may implement substantially similar techniques to transition back from power source 40 to power source 30 in the event that power to power source 30 becomes available again. In some examples, micro-controller 270 may be configured to cause ATS 16A to de-couple PSM 18A from the second power source, after a restore period, when power from the first power source becomes available again.

In some examples, the controller may determine a ride through period (e.g., holdup time) using the above described equation to determine when to begin the transfer process from power source 30 to power source 40 after power source 30 is unavailable. In these examples, the controller may cause PSM 18A to couple to power source 40 based on the determined ride through period (e.g., the controller may wait until the determined ride through period before beginning the transition from power source 30 to power source 40 after power source 30 is unavailable). In some examples, the controller may determine whether power from power source 30 is available during the ride through period. In these examples, the controller may de-couple power source 30 from the one or more components of electronic device 10C if power from power source 30 is unavailable after the ride through period.

The techniques of this disclosure may be implemented in a wide variety of devices or apparatuses, with an integrated circuit (IC) or a set of ICs (i.e., a chip set). Various components, modules, or units are described in this disclosure to emphasize functional aspects of devices configured to perform the disclosed techniques, but do not necessarily require realization by different hardware units. Rather, various units may be combined in a hardware unit or provided by a collection of interoperative hardware units.

Various examples have been described. These and other examples are within the scope of the following claims.

What is claimed is:

1. A method comprising:
   determining, with a controller of a power supply module of an electronic device, whether power from a first power source is unavailable to the power supply module;
   responsive to determining that power from the first power source is unavailable, de-coupling, with one or more de-coupling components of the power supply module that connect an automatic transfer switch (ATS) of the power supply module to an output of the power supply module, the first power source from one or more components of the electronic device that are connected to the output of the power supply module;
   subsequent to de-coupling the first power source from the one or more components of the electronic device, de-coupling, with the ATS, the power supply module from the first power source; and
   coupling, with the ATS, the power supply module to a second power source for delivering power to the one or more components of the electronic device.

2. The method of claim 1, wherein determining whether power from the first power source is unavailable comprises:
   receiving a signal indicative of at least one of an AC voltage and an AC current at a connection of the first power source to the power supply module; and
   determining that the power from the first power source is unavailable when one or both of the AC voltage and the AC current is less than a threshold.

3. The method of claim 1, wherein the one or more de-coupling components comprise one or more silicone controlled rectifiers (SCRs) of the power supply module, and wherein de-coupling the first power source from the one or more components of the electronic device comprises de-asserting one or more of the SCRs.

4. The method of claim 1, wherein the one or more de-coupling components comprise one or more silicone controlled rectifiers (SCRs) of a bridge rectifier of the power supply module, wherein de-coupling the first power source from the one or more components of the electronic device comprises de-asserting one or more of the SCRs of the bridge rectifier, and wherein the bridge rectifier is configured to convert negative portions of an AC power of the first power source to positive portions.

5. The method of claim 1, wherein de-coupling the power supply module from the first power source comprises toggling one or more relays the ATS of the power supply module from a close state to an open state.

6. The method of claim 1, wherein de-coupling the power supply module from the first power source comprises waiting until current through the one or more de-coupling components of the power supply module is approximately zero before de-coupling the power supply from the first power source.

7. The method of claim 1, further comprising:
determining a ride through period,
wherein coupling the power supply module to the second power source comprises coupling the power supply module to the second power source based on the determined ride through period.

8. The method of claim 1, further comprising:
determining whether power from the first power source is available during a ride through period,
wherein de-coupling the first power source from the one or more components of the electronic device comprises de-coupling the first power source from the one or more components of the electronic device if power from the first power source is unavailable after the ride through period.

9. The method of claim 1, further comprising:
after coupling the power supply module to the second power source, determining whether power from the first power source is available;
responsive to determining that power from the first power source is available, de-coupling, with the one or more de-coupling components of the power supply module, the second power source from the one or more components of the electronic device that are connected to the output of the power supply module;
subsequent to de-coupling the second power source from the one or more components of the electronic device, de-coupling, with the ATS, the power supply module from the second power source; and
coupling, with the ATS, the power supply module to the first power source for delivering power to the one or more components of the electronic device.

10. The method of claim 9, wherein de-coupling the power supply module from the second power source comprises de-coupling, after a restore period, the power supply module from the second power source.

11. The method of claim 1, further comprising:
recording transfer events of the ATS; and
communicating information indicative of the transfer events to the electronic device.

12. An electronic device comprising:
one or more components; and
a power supply module, the power supply module comprising:
an output connected to the one or more components;
an automatic transfer switch (ATS);
one or more de-coupling components that connect the ATS to the output of the power supply module; and
a controller configured to determine whether power from a first power source is unavailable to the power supply module, cause the one or more de-coupling components to de-couple the first power source from the one or more components of the electronic device that are connected to the output of the power supply module responsive to determining that power from the first power source is unavailable, cause the ATS to de-couple the power supply module from the first power source subsequent to causing the one or more de-coupling components to de-couple the first power source from the one or more components of the electronic device, and cause the ATS to couple the power supply module to a second power source for delivering power to the one or more components of the electronic device.

13. The device of claim 12, further comprising:
at least one of a voltage sensor and a current sensor configured to measure an AC voltage or an AC current, respectively, at a connection of the first power source to the power supply module,
wherein the controller is configured to receive a signal indicative of the at least one of the AC voltage or the AC current, and determine that the power from the first power source is unavailable when one or both of the AC voltage and the AC current is less than a threshold.

14. The device of claim 12, wherein the power supply module further comprises:
a silicone controlled rectifier (SCR) control unit,
wherein the one or more decoupling components comprise one or more SCRs, and
wherein the controller is configured to cause the SCR control unit to de-assert the one or more SCRs to de-couple the first power source from the one or more components of the electronic device.

15. The device of claim 12, wherein the power supply module further comprises:
a bridge rectifier configured to convert negative portions of an AC power of the first power source to positive portions, wherein the bridge rectifier includes the one or more de-coupling components, and wherein the one or more de-coupling components comprise silicone controlled rectifiers (SCRs); and
a SCR control unit,
wherein the controller is configured to cause the SCR control unit to de-assert the one or more SCRs to de-couple the first power source from the one or more components of the electronic device.

16. The device of claim 12, further comprising:
a relay driver,
wherein the ATS comprises one or more relays, and
wherein the controller is configured to cause the relay driver to toggle the one or more relays of the ATS from a close state to an open state to cause the ATS to de-couple the power supply module from the first power source.

17. The device of claim 12, wherein the controller is configured to wait until current through the one or more de-coupling units is approximately zero before causing the ATS to de-couple the power supply module from the first power source.

18. The device of claim 12, wherein the controller is configured to determine a ride through period, and wherein to cause the ATS to couple the power supply module to the second power source, the controller is configured to cause the ATS to couple the power supply module to the second power source based on the determined ride through period.

19. The device of claim 12, wherein the controller is configured to determine whether power from the first power source is available during a ride through period, and wherein the controller is configured to cause the one or more de-coupling components to de-couple the first power source from the one or more components of the electronic device if power from the first power source is unavailable after the ride through period.

20. A power supply module for delivering power to an electronic device, the power supply module comprising:
an output connected to one or more components of the electronic device;
an automatic transfer switch (ATS);

one or more de-coupling components that connect the ATS to the output of the power supply module; and a controller configured to determine whether power from a first power source is unavailable to the power supply module, cause the one or more de-coupling components to de-couple the first power source from the one or more components of the electronic device that are connected to the output of the power supply module responsive to determining that power from the first power source is unavailable, cause the ATS to de-couple the power supply module from the first power source subsequent to causing the one or more de-coupling components to de-couple the first power source from the one or more components of the electronic device, and cause the ATS to couple the power supply module to a second power source for delivering power to the one or more components of the electronic device.

* * * * *